Figure 1:
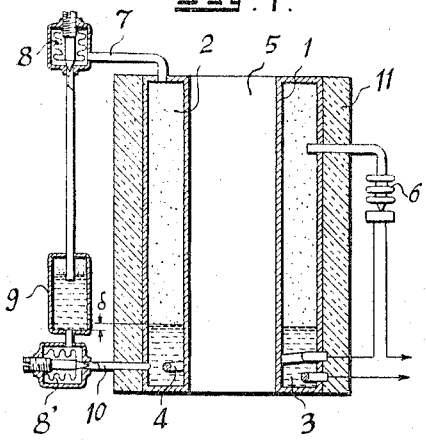

United States Patent Office 3,289,644
Patented Dec. 6, 1966

3,289,644
VAPOR HEATING APPARATUS OF CLOSED
OR HALF-CLOSED TYPE
Nobuhisa Kodaira, 851 Kamirenjaku Mitaka-shi, and
Norio Motegi, 752 4 Setagaya, Setagaya-ku, both of
Tokyo, Japan
Filed Nov. 20, 1964, Ser. No. 412,783
6 Claims. (Cl. 122—406)

This invention relates to improvements in vapor heating apparatus of closed or half-closed type used for maintaining a constant temperature in chemical reaction vessels, polymerization tanks, high molecular weight material melting apparatus, synthetic fiber spinning apparatus and synthetic fiber heat treating apparatus.

Up to this time, there has been used a heating apparatus comprising a closed vessel which is evacuated of gases but contains a heat medium liquid and a heat source, in which the heating is carried out by the vapor from the heat medium liquid. Various types of such apparatus have been used successfully in many fields, but they have had the disadvantage that the heat medium liquid, such as Dowtherm A, E and SK oil, contains trace amounts of gases and low boiling point materials. The gases can be relatively readily removed to such extent that they do not affect the heating action by subjecting the heat medium to distillation or vacuum treatment. However, it is extremely difficult to remove the low boiling point materials even by the distillation or vacuum treatment thereof and if a heating apparatus containing such material is used for a long time, the low boiling point material gradually separates as the evaporation and the condensation of the heat medium are repeated.

The low boiling point material accumulates in the upper part of the heating closed vessel, which results in lowering of the temperature and the heat transfer. That is to say, in using such a closed vessel containing a heat medium for a heating apparatus, the temperature distribution is uniform at the start, but the temperature at the upper part hereof is gradually reduced after several weeks or several months of use. In order to overcome such disadvantage, it has been proposed hitherto to repeat a distillation or vacuum treatment of a heat medium liquid prior to charging thereof whereby to drive out the low boiling point material contained therein. It has also been proposed to detect separation of the residual low boiling point material by the temperature decrease at the upper part of a closed vessel, then to drive out the low boiling point material vapor by making a small hole in the upper end of the closed vessel during heating and thereafter stop up the hole.

We obtained a translucent emulsion by connecting a narrow pipe to the upper end of a closed vessel containing about 15 liter of a heat medium, withdrawing the vapor from the upper part of the vessel through said pipe, and condensing the vapor. We found that after standing for some time the emulsion separated into a light, transparent liquid of about 5 ml. at the upper part of a glass vessel and a heavy, transparent liquid at the lower part. As a result of the analysis thereof, it was made clear that the upper liquid consisted substantially of water and the lower liquid consisted substantially of the heat medium enclosed in the vessel. The present invention is based on the discovery that the temperature distribution of a heating apparatus becomes uniform after the withdrawal therefrom of about 5 ml. of water, that is to say, the low boiling point material having an unfavourable influence on the temperature distribution is water in trace amount of about 0.03%, which can be separated by withdrawing the vapor out of the heating vessel, condensing it to an emulsion, and letting it stand to utilize the difference of specific gravity (the specific gravity of heat medium is 1.06 and that of water is 1).

In the present invention, a narrow pipe is connected at one end to the upper end of a closed vessel containing a heat medium liquid for heating, it is provided intermediate its end with an area reducer, and a small vessel for storing condensed vapor is connected to the other end of the narrow pipe. Another narrow pipe provided with another intermediate area reducer is connected between the lower end of the small vessel and the lower portion of the closed vessel. In the operation of such apparatus, vapor is withdrawn little by little from the upper end of the closed vessel containing the heat medium liquid, and is condensed and stored in the small vessel where water is separated and accumulated at the upper part and from which the heat medium is returned little by little to the closed vessel.

This invention is not limited to heating apparatus the vessel of which is evacuated and thereafter filled with the heat medium liquid, but may be adapted for a heat medium vapor heating apparatus of half-closed type, that is to say, in which the heat medium liquid is charged into a vessel provided with a narrow pipe open to the air, the liquid is heated to produce its vapor, the air in the vessel is replaced by the vapor and then the narrow pipe is closed. In accordance with the latter case also, the low boiling point material contained in the heat medium can be driven out of the vessel and the temperature distribution can be maintained uniform.

In such type of heating apparatus, the narrow pipe or valve connected to the upper part of the vessel is opened to drive out the mixed vapor containing the low boiling point material vapor, and this operation is repeated upon raising the temperature of the upper part of the vessel, which results in the reduction of the heat medium liquid, requiring that it be supplemented and therefore making it necessary to stop the heating operation for a time. This causes a great loss in the operation.

In accordance with the apparatus of the invention, the heat medium liquid is circulated and returned to the heating vessel, while only the low boiling point material contained in the liquid is separated and kept in the small vessel, hence it is not necessary to supplement the heat medium during the operation. Furthermore, in the case of using the apparatus of half-closed type after the replacement of the air, the narrow pipe or valve may be kept closed. In both cases the heat distribution at the upper part of the vessel can be maintained uniform, because a small amount of vapor is withdrawn from the pipe connected to the upper end of the heating vessel and a vapor flow is generated there.

The invention is further illustrated in the accompanying drawing wherein FIG. 1 shows schematically one form of apparatus of the invention and FIG. 2, FIG. 3, FIG. 4 and FIG. 5 show schematically other forms of our invention. With particular reference to the figures, 1 is a closed vessel, 2 a vapor chamber in the upper portion of the vessel 1, 3 a heat medium liquid enclosed in the closed vessel 1, and 4 a heating element. 5 is a heating chamber in which an article to be heated is placed. 6 represents a controlling device consisting of a bellows switch connected to the closed vessel which is operated by the vapor pressure of the heat medium vapor and switches on and off a connection between an electric source and the heating element 4 so as to maintain the temperature constant. 7 is a narrow pipe which is connected at one end to the upper end of the closed vessel for discharging the vapor and is provided intermediate its ends with an area reducer or throttling valve 8 capable of being controlled. 9 is a small vessel for condensing the vapor discharged, which is provided outside the closed vessel and into which the other end portion of the vapor leading pipe is inserted so as to prevent the mixing at the upper part thereof of the separated liquid and the vapor. To the lower end of the small vessel is connected one end of a pipe 10 which is provided with another controllable area reducer 8' intermediate its ends and which communicates at its other end with the heat medium liquid in the closed vessel. 11 represents a heat insulating material surrounding the closed vessel.

When the area reducers 8, 8' are closed and the electric source is connected to the heating element before the heating operation, the heating element heats the heat medium liquid to generate vapor. As the temperature of the vapor reaches a constant value, the bellows switch 6 is operated to switch off the power source and as the temperature lowers, the bellows switch is operated to switch on the power source, whereby the temperature of the vapor is maintained constant.

When the apparatus is used for a long time in such manner, the water contained in the heat medium liquid is gradually released and accumulates at the upper part of the vessel as vapor, which results in the lowering of the temperature of the upper part. Then, the area reducer 8 is opened a little, while the other area reducer 8' is kept closed, to lead the steam from the narrow pipe 7 to the small vessel 9 where it is cooled and condensed as an emulsion. Even if the steam occupies a relatively large volume of the upper part in the closed vessel 1, the condensation thereof in the small vessel 9 reduces remarkably its volume and so the steam is substantially discharged to the small vessel 9. When the water vapor is thus withdrawn from the vessel 1, the temperature of the upper part of the vessel is raised and thus maintained constant. When the emulsion in the small vessel is separated and becomes transparent after standing for a while, the lower area reducer 8' is opened a little, while keeping the upper area reducer opened and the heat medium stored in the lower part of the small vessel is returned to the closed vessel by the vapor pressure from above. In this case it should be noted that the bottom of the small vessel 9 is positioned a distance delta below the level of the heat medium liquid in the closed vessel. Therefore, in the case of heating again after cooling, the water separated at the upper part of the small vessel 9 does not flow into the closed vessel, so when this operation is repeated, the water in the heat medium liquid is completely released, separated and accumulated in the small vessel and the lowering of the temperature of the upper part of the closed vessel does not occur. In the aforementioned operation, the area reducers 8, 8' are closed at the start, then after some time the upper area reducer is opened, and then the lower area reducer is opened as explained above. In practical use, if the both area reducers are opened slightly, the water in the heat medium is completely separated and accumulated in the small vessel 9 and the lowering of the temperature at the upper part of the closed vessel does not occur after a repetition of the operation.

Figure 2:
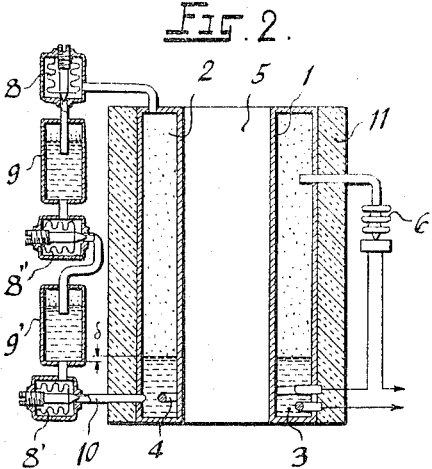

In the embodiment shown in FIG. 1 one vessel 9 for condensing and separating is provided, but in the FIG. 2 embodiment two vessels 9, 9' for condensing and separating are provided, they being connected through a connection pipe provided with an intermediate area reducer 8". In the latter embodiment, the water content retained in the heat medium liquid the first small vessel 9 is further separated in the second small vessel 9'. The openings of the area reducers 8", 8' are controlled so that the condensed liquid is resident in the small vessels 9, 9' for a time suitable for the separation. In FIG. 2, the small vessels are positioned in such a manner that the bottom of the second vessel is at a lower level than that of the heat medium liquid in the closed vessel for the reason explained in the description of FIG. 1.

The water separated and accumulated in the upper part of the small vessel 9 or 9' may be taken out through a narrow pipe inserted into the upper part of the small vessel as occasion demands.

Figure 3:
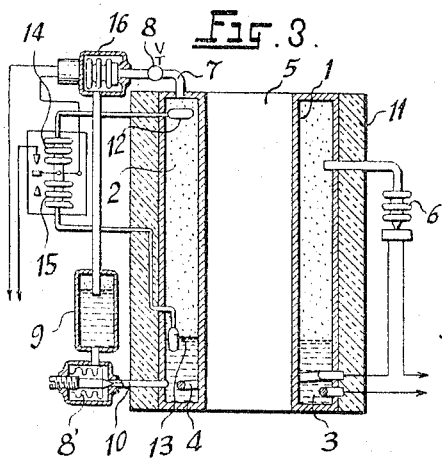

In FIG. 3, 8 is a fixed area reducer, 16 an electromagnetic valve connected in the intermediate part of a narrow pipe 7 that has one end communicated with the interior of the vessel 5 at the top thereof, and 9 a small vessel for condensing the discharged vapor, connected to the other end of the narrow pipe 7, said other end of the pipe extending into the inside of the vessel for the purpose of preventing the mixing of the separated liquid at the upper part thereof with the vapor. The lower end of the small vessel 9 is connected to the heat medium liquid part of the closed vessel through a pipe 10 provided with a fixed or controllable area reducer 8'. The area reducer 8' controls the flow rate of the condensed heat medium liquid to the closed vessel. 12 and 13 represent an upper and a lower sensing part for sensing the temperature of the upper and the lower part of the closed vessel respectively and 14 and 15 represent a heat differential responsive switch mechanism which is adapted to close an electric contact when the temperature at the sensing part 12 in the upper part of the closed vessel is lower than that of the sensing part 13, thereby to open the electromagnetic valve 16 so that the vapor at the upper part of the closed vessel is led to the small vessel through the narrow pipe 7. The narrow pipe may be provided with an area reducer 8 as occasion demands. When the vapor containing water is discharged from the upper part of the closed vessel, the temperature at the upper part rises and becomes the same as that in the rest of the closed vessel, and the differential part 14 is operated by the sensing part 12 to close the electromagnetic valve 16. The condensed liquid in the small vessel 9 is permitted to stand and separate and a part of the heat medium liquid is returned to the closed vessel. Then, when the temperature at the upper part of the closed vessel is lowered again, the aforementioned operation is repeated for correcting the temperature distribution.

Figure 4:
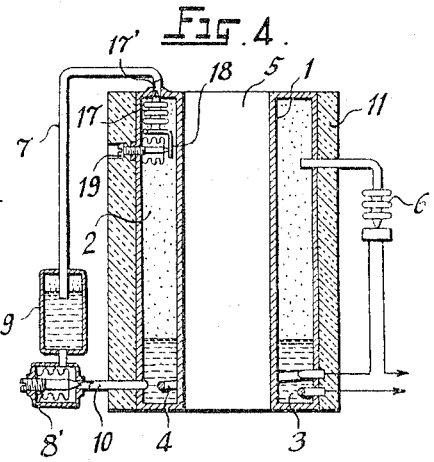

In the embodiment shown in FIG. 4, a closed bellows 17 containing a heat medium liquid like that in the closed vessel is provided in place of the temperature sensing part 12 and the differential part 14 and is positioned in the heat medium liquid vapor at the upper part of the closed vessel in such a manner that it causes a valve 17' to open and close the narrow pipe 7. That is to say, the sensing part 13 and the differential part 15 in FIG. 3 are omitted. Now, if the pressure corresponding to a given temperature in the closed vessel is P, the vapor pressure in the bellows 17 is also P when the temperature at the upper part of the vessel is the same as said given temperature, and the valve projection 17' at the upper end of the bellows 17 is adapted to close the narrow pipe 7. Then, as the temperature at the upper part of the closed vessel lowers, the vapor pressure in the bellows 17 lowers to P'. The bellows 17 is compressed by the pressure of P–P' and the valve projection 17' at the upper end of the bellows opens the narrow pipe 7 thereby to lead the vapor in the upper part of the closed vessel to a small vessel 9 connected therewith. The opening to the narrow pipe 7 is regulated in proportion to P–P' and therefore the bellows valve 17, 17' can perform the function of the area reducer 8 in FIG. 3, which may be omitted therefore. When the low temperature vapor is discharged the upper part of the vessel the temperature in said upper part rises to be the same as that of the other part, that is to say, P becomes the same as P', and the bellows is elongated to close the narrow pipe 7.

The vapor discharged into the small vessel 9 is condensed, let standing for a while and separated. The lower end of the small vessel is positioned at a lower level that of the heat medium liquid in the closed vessel so as to prevent the separated water from flowing into the closed vessel. The water separated and accumulated in the small vessel may be taken out through a narrow pipe inserted into the upper part of the small vessel as occasion demands, followed by stopping up the narrow pipe. 18 is a base for supporting the bellows 17 and 19 is a screw for controlling the base for the outside so as to control the position of the projection at the upper end of the bellows.

Figure 5:
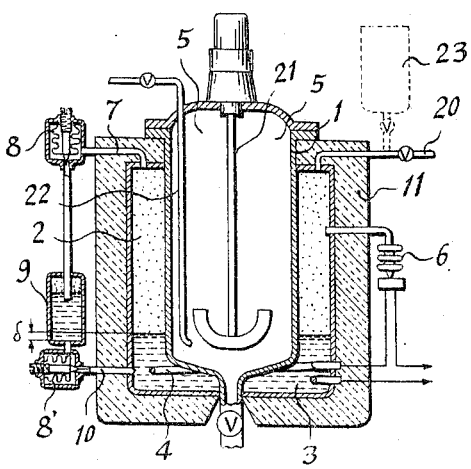

FIG. 5 shows the embodiment used for heating a reactor, wherein 1 is a closed vessel, 2 a vapor chamber, 3 a heat medium liquid contained in the closed vessel 1 and 4 a heating element. 5 represents a heating chamber in which a reaction liquid is present. 6 is a bellows switch connected to the vapor in the closed vessel for controlling the heating element as illustrated above. 7 is a narrow pipe connected to the upper end of the closed vessel, 8, 8' area reducers, 9 a small vessel for condensing and separating the low boiling point material and 10 a pipe for returning the heat medium liquid, communicated with the heat medium liquid in the closed vessel. 20 is a narrow pipe or a narrow pipe provided with a valve for initially charging heat medium liquid into the closed vessel and for discharging the air or gas in the closed vessel at the start of the operation and for thereafter discharging the low boiling point material vapor generated from the heat medium liquid at the start of operation, after which the pipe 20 is stopped. 21 is a stirrer of the reaction liquid and 22 is a pipe for feeding a gas or other material to the reaction liquid. 23 shown by a dotted line is a tank for storing heat medium liquid and for causing it to flow into the closed vessel as occasion demands. When the small vessel 9 for condensing and separating the low boiling point material is provided as in our invention, the tank 23 is not always required.

It will be clearly understood from the aforementioned description of our invention that a heat medium liquid in a heat medium vapor heating apparatus of closed type can be employed after removing the gas included therefrom without removing the low boiling point material included or produced by the decomposition, which has an unfavourable influence on the temperature distribution in the heating apparatus. This will bring a remarkable economical merit in the operation using such heat medium liquid.

What is claimed is:

1. In apparatus of the type comprising a closed vessel which surrounds a heating chamber, means providing a heat source in the lower portion of the closed vessel, and a quantity of normally liquid heating medium in the closed vessel, a portion of which is adapted to be maintained in vapor form by the heat source and to transfer heat from it uniformly to all portions of the heating chamber, means for withdrawing from the closed vessel low boiling point materials which are normally admixed with the heating medium and which accumulate in vapor form in the upper portion of the closed vessel after a protracted period of operation, said last named means comprising:
   (A) a settling vessel external to the closed vessel at one side thereof having its bottom at a level below the lowest surface level attained by liquid heating medium in the closed vessel during operation of the apparatus;
   (B) first duct means providing restricted communication between the interior of the closed vessel, at the uppermost portion thereof, and the top of the settling vessel;
   (C) valve means operatively associated with the first duct means for controlling communication therethrough; and
   (D) second duct means providing restricted communication between the bottom of the settling vessel and the interior of the closed vessel at a level in the latter which is below said surface level.

2. The apparatus of claim 1 further characterized by:
   (A) temperature responsive means for producing an output in response to a difference in temperature between the upper portion of the closed vessel and the lower portion thereof; and
   (B) actuating means operatively associated with said temperature responsive means and with the valve means for opening the valve means to establish communication through the first duct means when the temperature in the upper portion of the closed vessel is below that in the bottom portion thereof, and for maintaining the valve means closed when the temperature is substantially uniform throughout the interior of the closed vessel.

3. The apparatus of claim 2 further characterized by:
   (A) said actuating means comprising a closed bellows to which said valve means is connected; and
   (B) said temperature responsive means comprising a quantity of said normally liquid heating medium in said closed bellows.

4. The apparatus of claim 2 further characterized by:
   (A) said temperature responsive means comprising thermally responsive electric switch means; and
   (B) said actuating means comprising an electromagnet connected in series with said switch means and with a source of current.

5. The apparatus of claim 1 further characterized by: the settling vessel comprising a plurality of vertically superimposed chambers communicating with one another through restricted duct means.

6. The apparatus of claim 1 further characterized by: second valve means operatively associated with the second duct means for controlling communication therethrough.

References Cited by the Examiner

UNITED STATES PATENTS 2,875,263   2/1959   Narbut _____ 165—105 X

KENNETH W. SPRAGUE, *Primary Examiner.*